United States Patent
Nguyen et al.

(10) Patent No.: US 8,127,089 B1
(45) Date of Patent: Feb. 28, 2012

(54) HARD DISK CONTROLLER WHICH COORDINATES TRANSMISSION OF BUFFERED DATA WITH A HOST

(75) Inventors: Huy Nguyen, Laguna Hills, CA (US); William Wong, Cerritos, CA (US); Kha Nguyen, Anaheim, CA (US)

(73) Assignee: Marvell International Ltd., Hamilton (BM)

( * ) Notice: Subject to any disclaimer, the term of this patent is extended or adjusted under 35 U.S.C. 154(b) by 1052 days.

(21) Appl. No.: 12/030,173

(22) Filed: Feb. 12, 2008

Related U.S. Application Data

(60) Provisional application No. 60/889,823, filed on Feb. 14, 2007, provisional application No. 60/950,419, filed on Jul. 18, 2007.

(51) Int. Cl.
*G06F 12/00* (2006.01)
(52) U.S. Cl. .......... 711/154; 711/170; 710/52
(58) Field of Classification Search .......... 711/154, 711/170; 710/52
See application file for complete search history.

(56) References Cited

U.S. PATENT DOCUMENTS

| 2006/0015659 A1 | 1/2006 | Krantz et al. | 710/52 |
| 2006/0015774 A1 | 1/2006 | Nguyen et al. | 714/18 |

FOREIGN PATENT DOCUMENTS

| WO | WO 00/67107 | 11/2000 |
| WO | WO 02/17305 | 2/2002 |

OTHER PUBLICATIONS

"Fibre Channel Basics", Apple Computer, Inc., Technology Brief, 2006.

*Primary Examiner* — Matthew Bradley

(57) ABSTRACT

The transmission of buffered data is coordinated between a storage medium and a host in response to a request from the host. One or more blocks of data are transferred from the storage medium to a buffer memory. One or more frames of data are transmitted from the buffer memory to the host, wherein the number of blocks ending in the frame is recorded in a blocks/frame register, and possibly also in a block count accumulator register. Buffer release pulses for releasing buffer space in memory are sent to the buffer memory, based on the number of blocks in the blocks/frame register, or the number of blocks accumulated in the block count accumulator register when a signal is received from the host. A pointer which points to the last block of data successfully transferred is updated in accordance with the buffer release pulses.

15 Claims, 10 Drawing Sheets

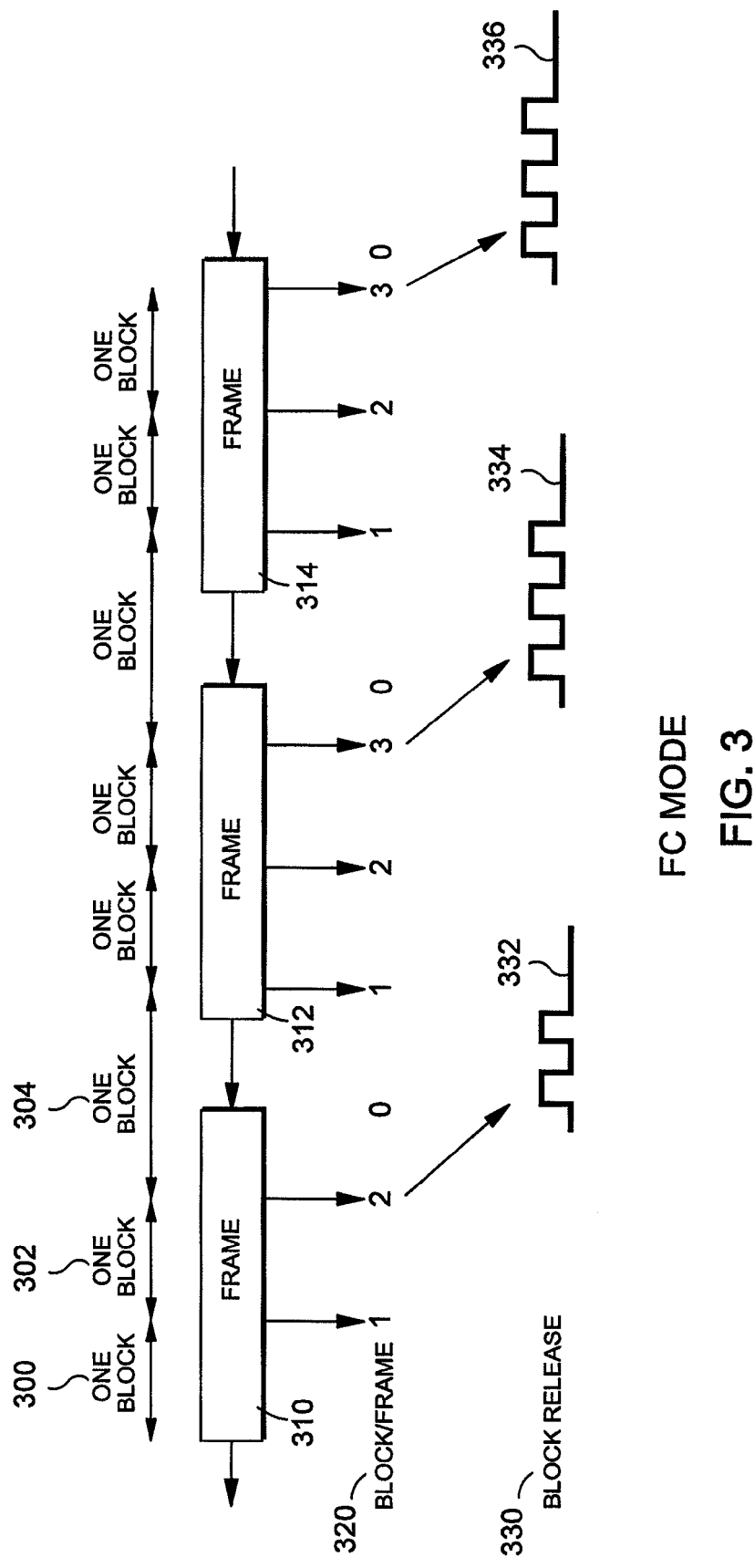

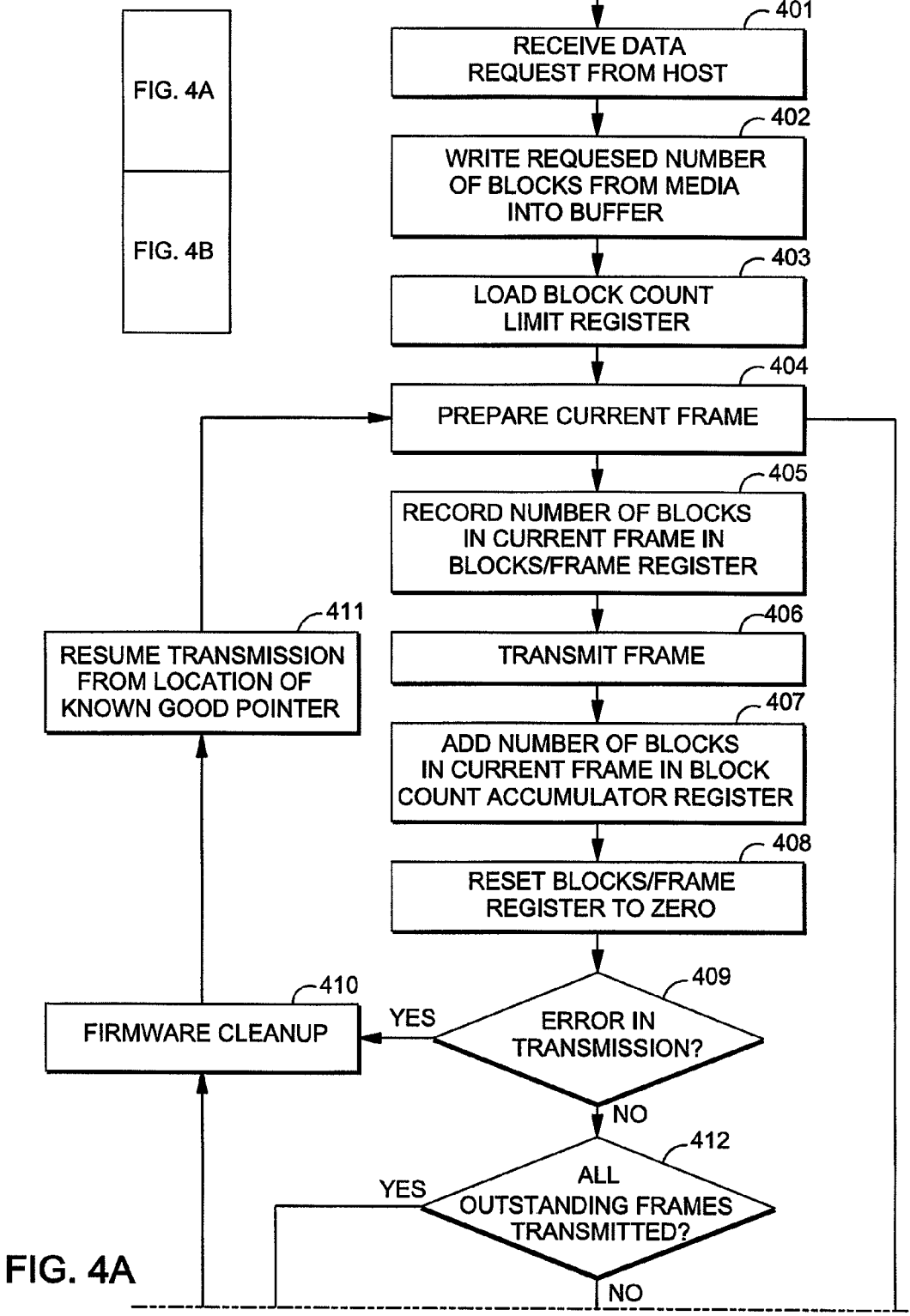

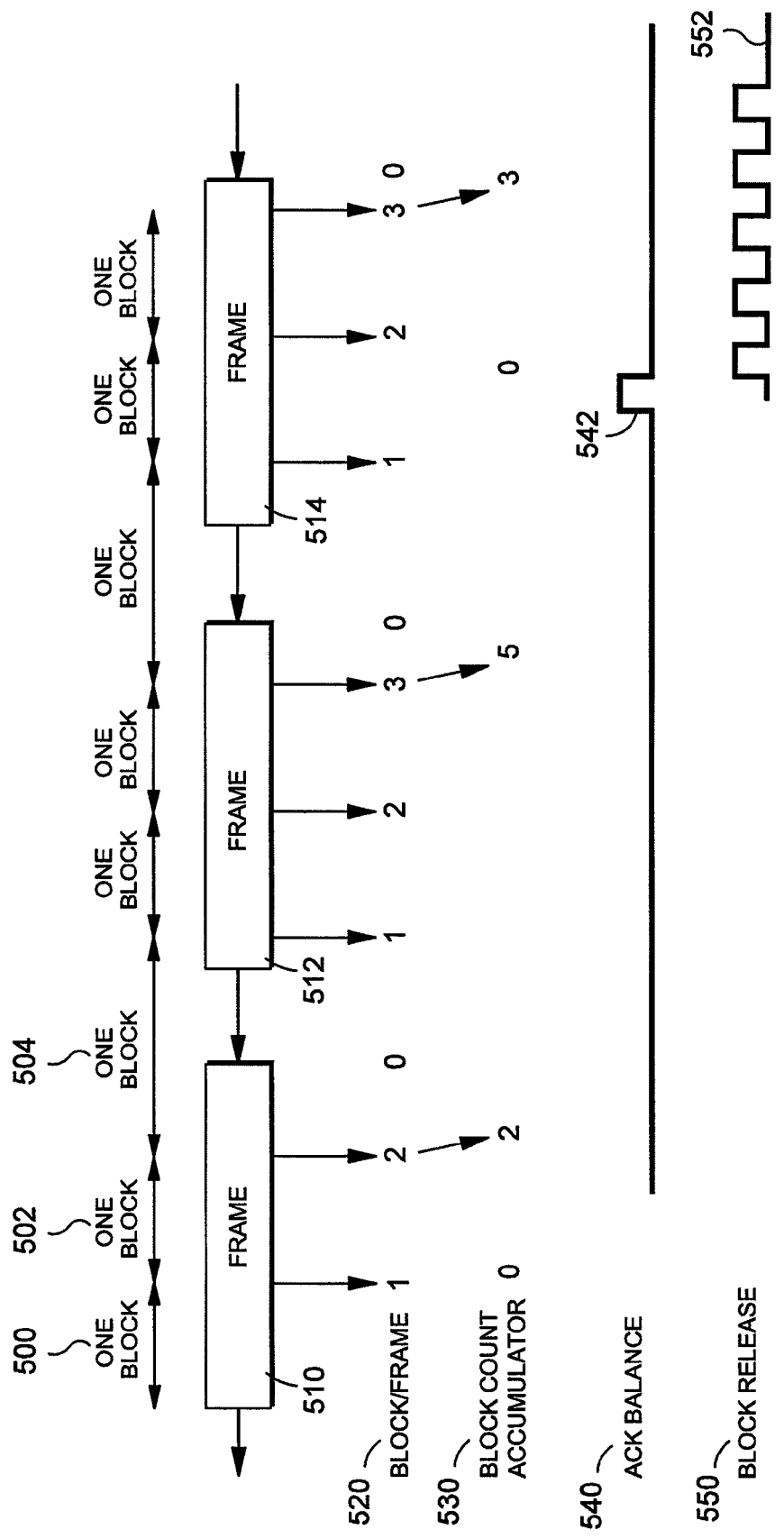
FIG. 5 SAS MODE

HARD DISK CONTROLLER WHICH COORDINATES TRANSMISSION OF BUFFERED DATA WITH A HOST

CROSS-REFERENCE TO RELATED APPLICATIONS

This application claims the benefit of U.S. Provisional Patent Application No. 60/889,823, filed Feb. 14, 2007, and U.S. Provisional Patent Application No. 60/950,419, filed Jul. 18, 2007, the contents of which are hereby incorporated by reference as if fully stated herein.

TECHNICAL FIELD

The present invention relates generally to data processing, and more specifically to coordinating transmission of data from a hard disk (or other storage media) to a host device.

BACKGROUND

Storing and retrieving data from a hard disk of a disk drive or other storage media is essential to modern electronics. Large amounts of data are typically stored on storage media. As such, it is important to quickly and accurately transfer data from storage media to a host device.

One common form of storage media is the magnetic surface of a hard disk. Data is typically stored on the magnetic surface of a hard disk in units of blocks, and each block has a block size (e.g., 512 bytes). A disk drive typically includes a buffer memory for buffering data to be transferred to a host (e.g., a host computer). The host requests an integer number of blocks from the hard disk, and the actual payload is the number of blocks multiplied by the block size.

In the actual physical data transfer, however, data is usually sent as a series of frames, and a frame size has no correlation to a block size. Since the number of bytes in a block has no correlation to the number of bytes in a frame, it may be difficult to track exactly which data has been successfully sent to the host, especially if several frames are transmitted in response to a single request. This may lead to difficulties in error correction, as well as determining which space in the buffer memory can be cleared for new data.

One conventional method for accounting for transmitted data is simply to fill the entire buffer memory (or some threshold portion thereof) with as many of the requested blocks as possible, and then to transfer the entire contents of the buffer memory at once. While this method can improve in tracking exactly how much data is sent to the host, such a technique can lead to several disadvantages.

For example, a Fibre Channel (hereafter "FC") interface provides a serial, multi-layered data transmission protocol for use with a range of storage and network protocols, and allows for relatively fast transfer of data. In the conventional buffer-based transmission method, however, space in the buffer cannot be cleared for re-use until the entire contents of the buffer have been transferred successfully. Thus, only one buffer transfer can be occurring at any given time, reducing the throughput from the storage media to the host.

Additionally, since buffer throughput is reduced, a larger buffer can be used to accommodate larger data requests more quickly. A larger buffer, however, leads to increased cost, as well as increased power consumption.

Another standard protocol for disk interfacing is Serial Attached Small Computer Interface (hereafter "SAS"). SAS is an interface technology that uses a serial, point-to-point technology to transmit data from an initiator device to one or more targets via "expander" devices that facilitate communication. However, SAS also suffers from problems related to a buffer-by-buffer transfer.

In particular, since data is transferred on a buffer-by-buffer basis, if there is any error in transmission of a frame to the host, transmission must be re-started completely from the beginning of the buffer, which may include re-loading the entire buffer from disk. For example, even if 85% of the buffer contents have been transferred successfully, an error at 86% may require that the first 85% be transferred again. Accordingly, the conventional method may lead to significant waste of time and delay.

In addition, an SAS interface using the conventional buffer-based transmission method also suffers from the drawbacks noted above, such as increased buffer space requirements, cost, and power consumption.

SUMMARY

The present invention addresses the foregoing by providing coordinated transmission of buffered data with a recipient.

Thus, in one aspect, the invention provides accounting for data transmitted from a storage medium to a host in response to a data request from the host. One or more blocks of data are transferred from the storage medium to a buffer memory, and a frame of data is transferred from the buffer memory to the host, and a total number of blocks that end in the frame is recorded in a blocks-per-frame register. One or more buffer release pulses is sent to the buffer memory upon transmission of the frame to the host, and a total number of the one or more buffer release pulses is based on the total number of blocks recorded in the blocks-per-frame register for the frame. Buffer space for one block in the buffer memory is released for each buffer release pulse received. Additionally, a known good pointer in the buffer memory that points to a position in the buffer memory corresponding to a last known block that has been successfully transferred to the host is updated, based on the one or more buffer release pulses.

Since space in the buffer memory is released based on the number of blocks in a transmitted frame, it is ordinarily possible to "micro-update" the buffer, rather than having to transmit or clear entire buffer contents at once. In addition, since buffer space is cleared after transmission of each frame, it is ordinarily possible to re-use portions of the buffer more frequently, thus increasing throughput of the buffer and reducing the size of the buffer needed.

In another aspect, the invention provides accounting for data transmitted from a storage medium to a host in response to a data request from the host. One or more blocks of data are transferred from the storage medium to a buffer memory, and one or more frames of data are transferred from the buffer memory to the host. The total number of blocks ending in each transmitted frame is recorded in a blocks-per-frame register and added into a block count accumulator register. A signal from the host from which it can be determined that all outstanding frames from the buffer memory have been received by the host is detected, one or more buffer release pulses are sent to the buffer memory upon detecting the signal, and a total number of the one or more buffer release pulses is based on the total number of blocks recorded in the block count accumulator register. Buffer space for one block in the buffer memory is released for each buffer release pulse received. In addition, a known good pointer in the buffer memory that points to a position in the buffer memory corresponding to a last known block that has been successfully transferred to the host is updated, based on the one or more buffer release pulses.

Since a pointer indicating the last successfully transferred data is updated as outstanding frames are successfully transferred to the host, it is ordinarily possible to re-start transmission after a transmission error or failure from the location of the pointer, ordinarily without having to re-transmit the entire contents of the buffer. In addition, since buffer space is cleared as data is transmitted successfully, it is ordinarily possible to increase throughput of the buffer memory, which allows for a smaller, cheaper, and more power-efficient buffer.

In still another aspect, there is an apparatus for accounting for data transmitted from a storage medium in response to an FC request from the host. There are means for transferring one or more blocks of data from the storage medium to a buffer memory, and means for transmitting a frame of data from the buffer memory to the host, wherein a total number of blocks that end in the frame is recorded in a blocks/frame register. In addition, there are means for sending one or more buffer release pulses to the buffer memory upon transmission of the frame to the host, wherein a total number of the one or more buffer release pulses is based on the total number of blocks recorded in the blocks-per-frame register for the frame. There are also means for releasing buffer space for one block in the buffer memory for each buffer release pulse received. Furthermore, there are means for updating a known good pointer in the buffer memory based on the one or more buffer release pulses, wherein the known good pointer points to a position in the buffer memory corresponding to a last known block that has been successfully transferred to the host.

In yet another aspect, there is an apparatus for accounting for data transmitted from a storage medium to a host in response to a SAS request from the host. There are means for transferring one or more blocks of data from the storage medium to a buffer memory, and means for transmitting one or more frames of data from the buffer memory to the host, wherein a total number of blocks ending in each transmitted frame is recorded in a blocks/frame register and added into a block count accumulator register. In addition, there are means for detecting a signal from the host from which it can be determined that all outstanding frames that have been sent from the buffer memory have been received by the host, and means for sending one or more buffer release pulses to the buffer memory upon detecting the signal, wherein a total number of the one or more buffer release pulses is based on the total number of blocks recorded in the block count accumulator register. Furthermore, there are means for releasing buffer space for one block in the buffer memory for each buffer release pulse received, and means for updating a known good pointer in the buffer memory based on the one or more buffer release pulses, wherein the known good pointer points to a position in the buffer memory that corresponds to a last known block that has been successfully transferred to the host.

A more complete understanding of the invention can be obtained by reference to the following detailed description in connection with the attached drawings.

BRIEF DESCRIPTION OF THE DRAWINGS

FIG. 3 is a graphical representation of a sample progression of signals of the invention in an FC disk environment.

FIG. 5 is a graphical representation of a sample progression of signals of the invention in a SAS disk environment.

DETAILED DESCRIPTION

Figure 1:
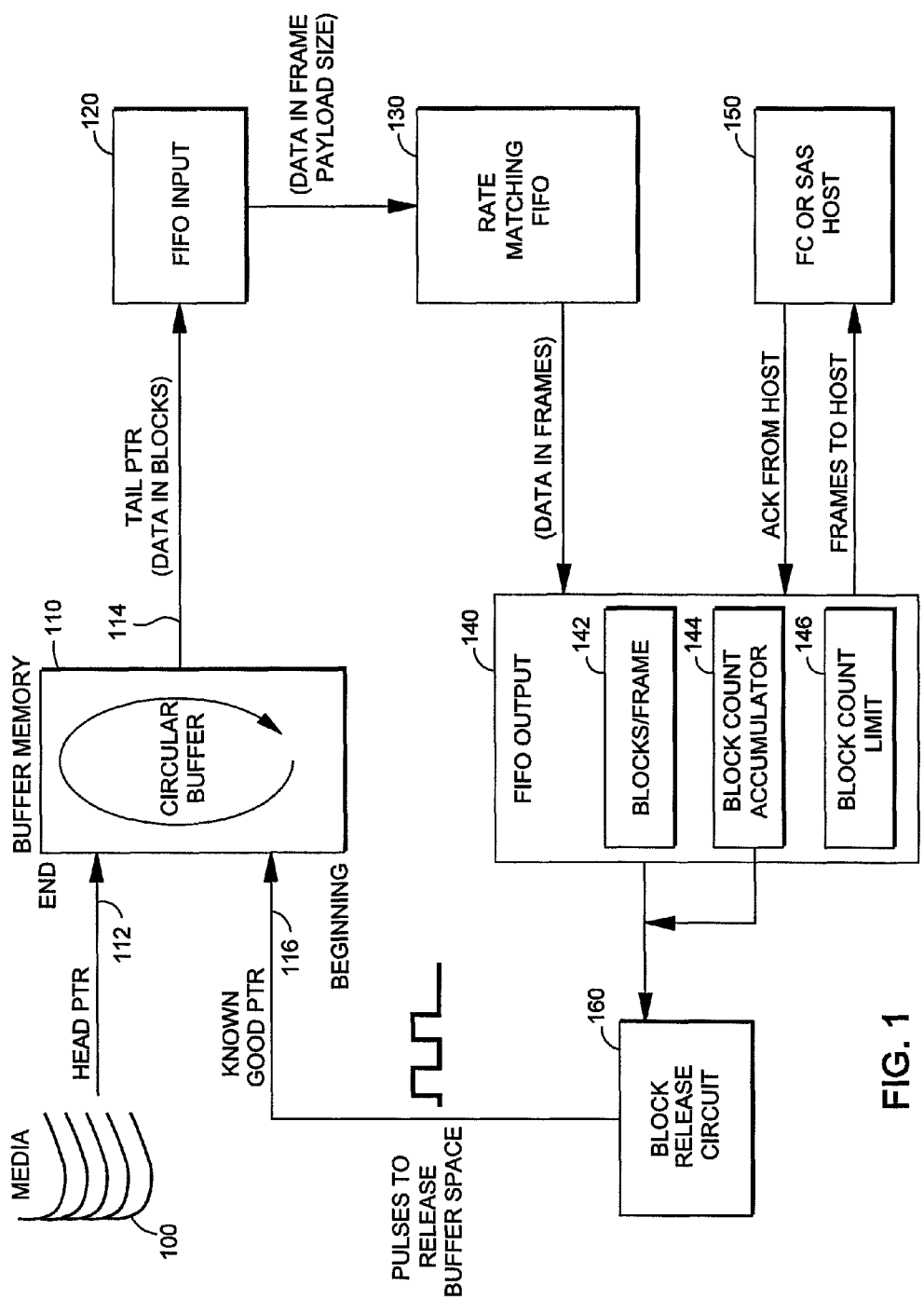
FIG. 1 is a block diagram of a sample embodiment of present invention.

FIG. 1 is a block diagram of a sample data transmission system in accordance with one implementation of the present invention.

The data transmission system includes media 100, buffer memory 110, FIFO input logic 120, rate matching FIFO 130, FIFO output logic 140, host 150 and block release circuit 160.

Additionally, as shown in FIG. 1, buffer memory 110 includes head pointer 112, tail pointer 114, and known good pointer 116, each of which point to respective positions in buffer memory 110. As also shown, FIFO output logic 140 includes blocks-per-frame register 142, block count accumulator register 144, and block count limit register 146.

In the embodiment of FIG. 1, media 100 is depicted as a series of disks, commonly abbreviated as a "hard disk" or "disk". In one implementation, a hard disk is a non-volatile storage device that stores digitally encoded data on rapidly rotating platters with magnetic surfaces. The hard disk can be external to a host device (e.g., a computer) or integrated within the host device. The hard disk is typically included in a "hard disk drive" (not shown) used to read and write to media 100. While hard disk drives have traditionally been developed for use with computers, applications for hard disk drives have expanded to include digital video recorders, digital audio players, personal digital assistants, digital cameras, video game consoles, and mobile phones, and it is expected that the number of devices using hard disk drives will continue to expand as hard disk drive technology advances.

Although media 100 is depicted as a series of disks, the present invention may also apply to various other embodiments and types of storage media. For example, media 100 could be comprised of a CD/DVD drive, jump drive, floppy disk, magnetic tape, flash memory, optical storage or optical jukebox storage, holographic storage, phase-change memory, and off-site network storage, among others.

Data is stored on media 100 in units of blocks, with each block typically being 512 bytes. Other block sizes are possible. A host device such as a computer requests data from the media in units of blocks, and the data is fetched from media 100 and provided to the host.

Buffer memory 110 is coupled to media 100, and is used to temporarily store data from media 100 for transmission to host 150. Buffer memory 110 can be stored in a hard disk drive along with media 100, although other implementations are possible. As shown in FIG. 1, buffer memory 110 is a circular buffer. A circular buffer is a single, fixed-size buffer that acts as if the buffer were connected end-to-end, thus allowing data in the buffer to be consumed without shuffling the remaining contents of the buffer. The exact size of buffer memory 110 may vary based on the particular industry or environment in which buffer memory 110 is being used. As with media 100, various hardware configurations and media types of buffer memory 110 are possible. For purposes of clarity, FIG. 1 includes labels for a "Beginning" and "End" of buffer memory 110, although these locations may change because of the circular nature of buffer memory 110.

Buffer memory 110 includes head pointer 112, tail pointer 114, and known good pointer 116, each of which point to respective positions in buffer memory 110. In this regard, while the pointers actually point to positions in buffer memory 110, the particular orientation of the arrows is depicted in FIG. 1 so as to illustrate how these pointers relate to other elements, as will be described more fully below.

Head pointer 112 indicates the position in buffer memory 110 up to which data transferred from media 100 is stored. Thus, for example, if buffer memory 110 is empty and data is read from media 100, head pointer 112 will indicate the "top" of the filled data. Accordingly, when additional data is input from media 100, head pointer 112 moves closer to the end of the buffer, unless the end of buffer memory 110 is reached, in which case head pointer 112 loops back around to the beginning of buffer memory 110.

Tail pointer 114 indicates the position in buffer memory 110 from which data is output. Tail pointer 114 initially starts at the beginning of buffer memory 110, and moves towards head pointer 112 as data is transferred. Thus, the difference in position between head pointer 112 and tail pointer 114 indicates the data in the buffer from media 100 that has not yet been output from buffer memory 110. When tail pointer 114 catches up to the same position as head pointer 112, it is an indication that all of the data currently input from media 100 has been transferred from buffer memory 110.

In this regard, while tail pointer 114 is depicted in FIG. 1 as pointed towards FIFO input logic 120, the orientation of the arrow is simply to indicate that the data output from buffer memory 110 at the position of tail pointer 114 is output to FIFO input logic 120.

Known good pointer 116 indicates a position in buffer memory 110 up to which data has been successfully transferred. Since known good pointer 116 indicates the last data that was successfully transferred, known good pointer 116 also indicates where to re-start data transmission from if problems occur in transmission. Thus, known good pointer 116 provides a position to go back to if something goes wrong. In practice, known good pointer 116 should follow tail pointer 114 throughout buffer memory 110, indicating which of the transferred data was actually transferred successfully.

While known good pointer 116 is shown as an arrow from block release circuit 160 in FIG. 1, this is simply to illustrate that the position of known good pointer 116 is based on the output of block release circuit 160. In one implementation, known good pointer 116 points to a position in buffer memory 110, and is not an actual signal from block release circuit 160. The operation of known good pointer 116 will be described in more detail below.

FIFO input logic 120 is coupled to buffer memory 110 and to rate matching FIFO 130, and comprises a hardware or software-implemented logic block for converting blocks of data from buffer memory 110 into frames of data for transmission to rate matching FIFO 130. As mentioned, during an actual physical transfer, data is usually required to be in units of frames. Thus, FIFO input logic 120 implements this conversion. In this regard, the payload size of a frame may vary, for example according to the interface standard used. In an FC disk environment, the frame payload size ordinarily ranges from 0 to 2112 bytes, whereas in an SAS disk environment, the payload size ordinarily ranges from 1 to 1024 bytes.

In addition to converting blocks to frames, FIFO input logic 120 may add protection and error detection information to the frame, such as a cyclic redundancy check (CRC) code or a checksum bit. This may provide further assistance in detecting errors and verifying data integrity.

Rate matching FIFO 130 is coupled to FIFO input logic 120 and to FIFO output logic 140, and is used to regulate the speed of transmission of data between FIFO input logic 120 and FIFO output logic 140. In particular, FIFO input logic 120 generally accepts data in quick bursts, whereas FIFO output logic 140 reads data out in a slow but steady rate, which may be dependent on the speed at which the host 150 is able to accept data. Thus, rate matching FIFO 130 creates a buffer area for temporary storage of the data, and may include additional control logic to regulate the speed of transmission in and out of rate matching FIFO 130 based on factors such as the speed of the host.

FIFO output logic 140 is coupled to rate matching FIFO 130, host 150, and block release circuit 160, and provides several functions. FIFO output logic 140 retrieves data from rate matching FIFO 130 in units of frames, and may also verify CRC code or other data to confirm the integrity of the data. In addition, FIFO output logic 140 prepares a frame header to be sent ahead of the payload. FIFO output logic 140 then sends the frame header followed by the frame payload data to host 150. FIFO output logic 140 also receives signals from host 150, such as an ACK_BALANCE signal that indicates that all outstanding frames from the buffer have been successfully received by host 150. Additionally, FIFO output logic 140 transmits data to block release circuit 160 in order to release space in buffer memory 110. These processes will be described in detail below.

FIFO output logic 140 includes blocks-per-frame register 142. Blocks-per-frame register 142 is used to record an integer number of blocks that comprise a given frame. More specifically, when a current frame is prepared for transmission, an integer number of blocks in the frame are recorded in blocks-per-frame register 142. In one implementation, blocks-per-frame register 142 treats a block that terminates in a frame as a whole block. Thus, if a block begins in a first frame and ends in a second, the block will be counted as a whole block for the second frame, but not the first.

FIFO output logic 140 also includes block count accumulator register 144. Block count accumulator register 144 is used to accumulate the integer number of blocks in successive transmitted frames, up until a signal is reached to reset block count accumulator register 144 back to zero or a threshold is reached. For example, if a first transmitted frame contained three blocks and a second transmitted frame contained two blocks, block count accumulator register 144 would store a value of five blocks.

FIFO output logic 140 further includes block count limit register 146. Block count limit register 146 stores an integer number of blocks as an upper limit, and works in combination with block count accumulator register 144 to allow time for host 150 to process received frames of data or to recover from transmission failure. More specifically, in the case that host 150 is relatively slow or is otherwise occupied so as to slow down data reception and processing, block count limit register 146 and block count accumulator register 144 are used to halt transmission, which allows host 150 to either catch-up in processing, or to reboot and restart transmission from the last block successfully transferred.

Block release circuit 160 is also coupled to FIFO output logic 140. Block release circuit 160 is a hardware circuit which inputs contents of registers from FIFO output logic 140, converts the register contents to a series of pulses, and transmits the series of pulses to buffer memory 110 in order to release buffer space in buffer memory 110.

Host 150 is a host device that requests a number of data blocks from media 100, and receives the data from media 100 via FIFO output logic 140. Additionally, host 150 transmits signals to FIFO output logic 140 to indicate that data has been successfully received. While a common embodiment of host 150 is a computer, numerous other devices could function as the host. For example, host 150 could be a digital video recorder, digital audio player, personal digital assistant, digital camera, video game console, mobile phone, or any other device that can be configured to access media 100.

An example operation of the invention in a Fibre Channel (FC) disk environment will now be described with respect to FIG. 2.

Briefly, Fibre Channel is a set of advanced data transport standards that allow large amounts of data to be moved between computers, servers, disk arrays, and other devices, and includes standards that support both channel and networked operations. Fibre Channel is fashioned as a carrier of protocols, including SCSI-3 command sets and IP command sets. Though Fibre Channel has many features of a network, Fibre Channel is less a network than a high-speed switching system that interconnects relatively local devices. Three common topologies used in the FC standard are point-to-point, arbitrated loop, and switched fabric. Each topology satisfies different application and installation requirements, exhibits different performance characteristics, and is subject to different scalability limits. Further detail on the general structure and operation of an FC disk environment is available to those skilled in the art, and accordingly will not be described herein further detail.

Figure 2:
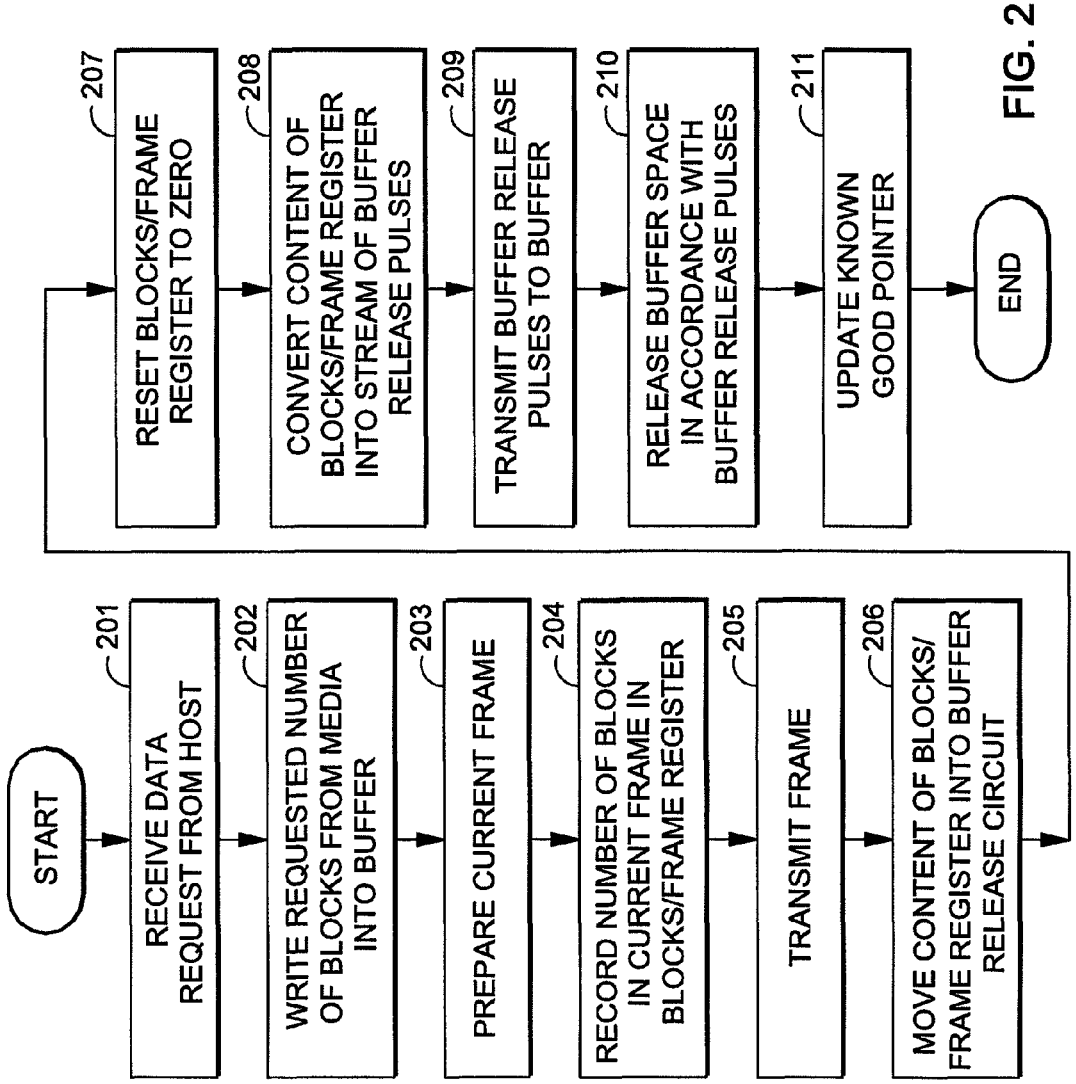
FIG. 2 is a flowchart that illustrates a sample process of accounting for transmission of buffered data from storage media to a host device in an FC disk environment.

As shown in FIG. 2, the process of transmitting buffered data begins in step 201, where a data request is received from host 150. As indicated above, host 150 requests data from media 100 (or more specifically, from the device supporting the media) in units of blocks. Thus, for example, host 150 may request 50 blocks of data from media 100 for use in an application.

In step 202, media 100 retrieves the requested data and writes the requested number of blocks into buffer memory 110. At this point, head pointer 112 is adjusted to point to the "top" of the data, i.e., the last data that will be transferred from the requested blocks loaded into the buffer memory so far. Since data has not yet been output from the buffer, tail pointer 114 and known good pointer 116 are not adjusted.

In step 203, a frame is prepared for transmission to host 150. Thus, the system may determine a frame payload size based on a default setting or on other environment or application-sensitive factors. To prepare the frame, the requested data blocks are sent to FIFO input logic 120, which converts the data in blocks into data in the size of the designated frame payload. Additionally, FIFO input logic 120 may add data to aid in error detection, such as a CRC word. The data, now in the size of a frame payload, is sent to rate matching FIFO 130 as shown in FIG. 1. Rate matching FIFO 130 stores the data, and may additionally delay sending of the data in order to match the speed of host 150. The data is read out in frames and sent to FIFO output logic 140 for transmission to host 150.

In step 204, the number of blocks that comprise the frame to be transmitted is recorded in blocks-per-frame register 142 in FIFO output logic 140. Thus, even though the block and frame size may not be correlated, blocks-per-frame register 142 stores a record of how many blocks are included in the current frame. As noted above, a block may span two frames. In this situation, blocks-per-frame register 142 counts the block in the frame in which the block ends, rather than the frame in which it originates. This situation is depicted in FIG. 3 and will be described more fully below.

In step 205, the current frame is transmitted from FIFO output logic 140 to host 150. This may be accomplished by any number of means, including wired or wireless transmission, as fits the current application and the type of host device and media.

In step 206, the content of blocks-per-frame register 142 is moved to buffer release circuit 160. Buffer release circuit 160 is a hardware circuit configured to convert the contents of the blocks-per-frame register into a series of buffer release pulses. More specifically, the value of the number of blocks recorded in blocks-per-frame register 142 is converted to an equal number of buffer release pulses. Thus, for example, if the transmitted frame comprised two blocks of data, the value 2 is sent to block release circuit 160. Since the number of blocks is always an integer number, the number of block release pulses prepared by block release circuit 160 is also an integer number.

In step 207, the content of the blocks-per-frame register 142 is reset to 0. This allows the blocks-per-frame register to store a clean value for the next frame to be prepared and transmitted to host 150.

In step 208, block release circuit 160 converts the value received from FIFO output 140 into a series of buffer release pulses for transmission to buffer memory 110. Using the example above, a series of two buffer release pulses is prepared by block release circuit 160. This example is depicted in FIG. 1.

In step 209, the buffer release pulses are transmitted from block release circuit 160 to buffer memory 110.

In step 210, buffer memory 110 releases space in accordance with the pulses received from buffer release circuit 160. Thus, in the example, buffer memory 110 would release space in the buffer for two blocks. The released space can then be used to store new data from media 100.

In step 211, known good pointer 116 is updated to reflect the blocks successfully transferred to host 150. Thus, in the example, known good pointer 116 is moved two spaces ahead in the buffer, to match the location of tail pointer 114. Accordingly, if there is any error in transmission of later blocks, transmission can resume from the location of known good pointer 116, rather than having to re-transmit the entire contents of the buffer.

FIG. 3 is a graphical representation of a sample progression of signals in the FC disk environment. The top of FIG. 3 depicts a series of blocks being read from media 100 for transmission to host 150. As shown in FIG. 3, the data in a block can span two frames. For example, block 304 is transmitted partially in frame 310 and partially in frame 312.

The Block/Frame values shown at 320 indicate the value stored in blocks-per-frame register 142. Thus, in the example of FIG. 3, Block/Frame 320 counts a value 1 for the first block 300 in frame 310, and counts a value 2 for the second block 302 in frame 310. Since block 304 does not end in frame 310, block 304 is not recorded in blocks-per-frame register 142 for frame 310, and rather is recorded as the first block in frame 312, the frame in which block 304 ends. Additionally, the value in blocks-per-frame register 142 is reset to 0 after each frame is transmitted.

Block Release 330 depicts the buffer release pulses that are sent from buffer release circuit 160 over time. In one implementation, the pulses are sent as soon as the current frame is transmitted, and the number of pulses is equal to the content of the blocks-per-frame register for the transmitted frame. Thus, for example, two pulses are shown as item 332, since there was a value of 2 recorded in blocks-per-frame register 142 for frame 310.

By virtue of the above arrangement, the size of the buffer memory required for an application can be reduced, since available space in the buffer memory is "micro-updated" on a block basis. In particular, as soon as a frame is transmitted to host 150, the buffer release pulses release the corresponding block space in the buffer. Thus, buffer space is made more quickly available, and the throughput of the buffer is increased. As such, a smaller, cheaper, and more energy-efficient buffer can be used.

Figure 4B:
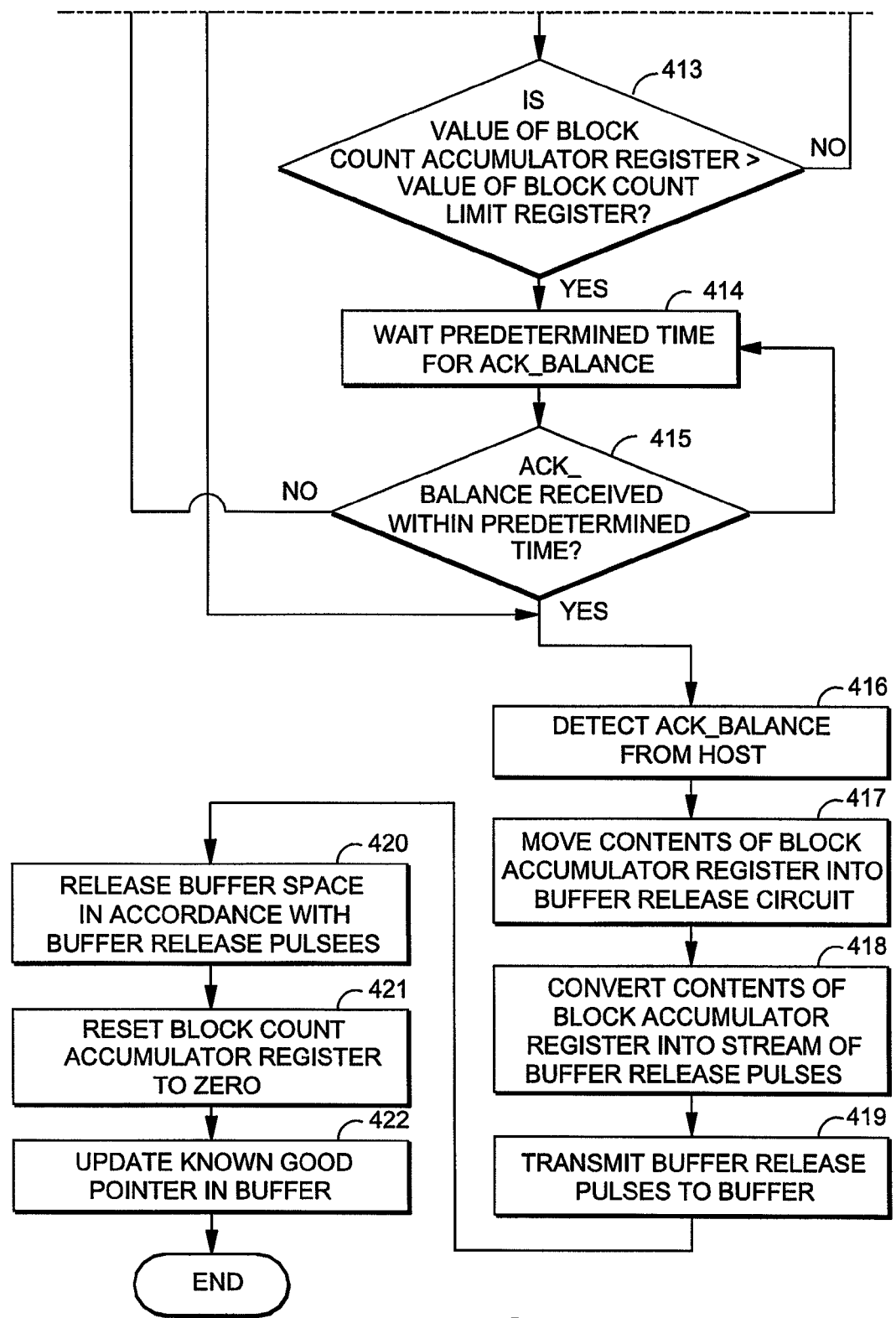
FIG. 4 is a flowchart that illustrates a sample process of accounting for transmission of buffered data from storage media to a host device in a SAS disk environment.

Turning to another aspect of the invention, an example operation of the invention in a SAS disk environment will now be described with respect to FIG. 4.

Briefly, Serial Attached SCSI (SAS) is a computer bus technology, and in particular is a serial communication protocol for direct attached storage (DAS) devices. Though SAS uses serial communication instead of the parallel method found in traditional SCSI devices, SAS still uses SCSI commands for interacting with SAS end devices. SAS is layer-based, and a typical SAS network includes an initiator device that originates device service and task management requests to be processed by a target device, a target device such as a hard disk drive containing logical units and target ports that receives requests for processing and sends responses to initiator devices, and expander devices that facilitate communication between SAS devices. Further details of the SAS disk environment are available to one of skill in the art, and as such will not be discussed here in more detail.

The process of coordinating transmission of buffered data in a SAS environment begins in step 401, when a request is received from host 150. Host 150 requests data from media 100 in units of blocks. Thus, for example, host 150 may request 100 blocks of data from media 100 for use in an application.

In step 402, media 100 retrieves the requested data and writes the requested number of blocks into buffer memory 110. As in the FC disk environment, head pointer 112 is adjusted to point to the "top" of the data, i.e., the last data that will be transferred from the received blocks. Since no data has been output at this time, tail pointer 114 and known good pointer 116 are not adjusted.

In step 403, block count limit register 146 is loaded with a limit value indicating a maximum number of transmitted blocks that are allowed before receipt of a signal from host 150. In one implementation, the signal from the host is a signal from which it can be determined that all outstanding frames that have been sent from the buffer memory have been received by the host. In one aspect, this signal is called an ACK_BALANCE signal which indicates that the host has successfully received all frames which have been transmitted since the last signal. Thus, an ACK_BALANCE signal from host 150 indicates host 150's acknowledgment that host 150 has successfully received all outstanding frames that have been sent from FIFO output logic 140. However, in case of a slower host or an error in transmission, an ACK_BALANCE signal might not be received for an extended period of time. Thus, to avoid loss or overwriting of data, block count limit register 146 stores a limit value of blocks that can be in transit to host 150, and transmission is halted if the number of blocks in transit meets or exceeds the limit value. Thus, block count limit register 146 provides a "shutoff valve" to stop transmission so that host 150 can catch up in receiving and processing frames, or perform recovery operations if necessary.

Numerous methods may be used to set the value in block count limit register 146. In one implementation, host 150 or other logic such as FIFO output logic 140 sets this value automatically. Thus, for example, the value of block count limit register 146 could be based on detection of a processing or transmission speed of host 150, or on the amount of data to be transmitted to the host 150. Alternatively, the limit value could be based on other variables such as the size of buffer memory 110, or the number of accesses that have occurred over a period of time. In still other embodiments, a user or system administrator may enter this value.

In step 404, a frame is prepared for transmission to host 150. In one implementation, the system may determine a frame payload size based on a default setting or on other environment or application-sensitive factors. Thus, for example, a frame payload size may be 1024 bytes. To prepare the frame, the requested data blocks are sent to FIFO input logic 120, which converts the data in blocks into data in the size of the designated frame payload. Additionally, FIFO input logic 120 may add data to aid in error detection (e.g., a CRC word). The data, now in the size of a frame payload, is sent to rate matching FIFO 130. Rate matching FIFO 130 stores the data, and may additionally delay sending of the data in order to match the speed of host 150. The data is read out in frames and sent to FIFO output logic 140 for transmission to host 150.

In step 405, the number of blocks comprising the current frame is recorded in blocks-per-frame register 142 in FIFO output logic 140. Thus, even though the frame size may be variable, blocks-per-frame register 142 will store a record of how many blocks are included in the current frame. As discussed, a block may span two frames. In such a situation, blocks-per-frame register 142 counts the block in the frame in which the block ends, rather than the frame in which the block originates. This situation is depicted in FIG. 5 and will be described more fully below.

In step 406, the current frame is transmitted from FIFO output logic 140 to host 150. As is the case in an FC disk environment, this may be accomplished by any number of means, including wired or wireless transmission, as fits the current application and the type of host device and media.

In step 407, the number of blocks in the transmitted frame is added to block count accumulator register 144. In this regard, the value of block count accumulator register 144 is only cleared once an ACK_BALANCE signal is received from host 150. Thus, the value stored in block count accumulator register 144 increases as each successive frame is transmitted, up until an ACK_BALANCE signal is received.

In step 408, the content of blocks-per-frame register is reset to 0, which prepares the register for recording the number of blocks in the next transmitted frame. This occurs after each current frame is transmitted to host 150.

In step 409, a determination is made whether an error has occurred in transmission, i.e., whether the frame was successfully transmitted to host 150. If an error is detected, the process proceeds to step 410, where firmware is used to "clean up" the error and to resume transmission in step 411 from the location in buffer memory 110 of the last data that was successfully transferred, in a process that will be described in more detail below. On the other hand, if no error in transmission is detected, the process proceeds to step 412.

In step 412, a determination is made whether all outstanding frames from FIFO output logic 140 have been successfully transferred to host 150. In one implementation, "outstanding frames" means all frames that have been transmitted and have not been previously acknowledged as successfully received, i.e., any frames that have been transmitted since the last ACK_BALANCE signal from host 150. The ACK_BALANCE signal thus indicates whether host 150 has "caught up" in receiving the data transmitted to host 150. For example, if two frames have been transmitted since the last ACK_BALANCE signal, another ACK_BALANCE is not transmitted until those two frames have been successfully received at host 150.

In one implementation, additional processes may be required before host 150 sends the ACK_BALANCE signal. For example, host 150 may first perform error checking to determine if the error-free frame was received as it was sent. In other implementations, host 150 could apply stricter criteria such as checking for out of sequence frames or for proper context before sending the ACK_BALANCE signal, but such additional checks are simply based on operational policy.

If host 150 has successfully received all outstanding frames from FIFO output logic 140, host 150 transmits an ACK_BALANCE signal to FIFO output logic 140, and space in the buffer memory 110 can be released, as will be described below.

On the other hand, if it is determined in step 412 that not all outstanding frames have been transmitted, the system determines in step 413 whether the value of block count accumulator register 144 is greater than the value in block count limit register 146. If not, the process proceeds back to step 404, and frame transmission continues. However, if the value of block count accumulator register 144 is greater than the value in block count limit register 146, transmission of the frames is halted in order to avoid further overload of frames at the host 150. In other words, since host 150 has not yet been able to process receiving all outstanding frames, transmission is halted so that further frames are not sent to host 150, possibly leading to overwritten data or lost frames. The process then proceeds to step 414.

In step 414, the system delays for a predetermined time to allow host 150 to catch up in processing received frames and issue an ACK_BALANCE signal, if possible. In particular, if host 150 has not yet sent an ACK_BALANCE signal to indicate successful receipt of all outstanding frames from FIFO output logic 140, one of two scenarios are likely. First, host 150 may simply still be in the process of receiving and processing frames, and simply needs extra time to finish this processing and issue the ACK_BALANCE signal. On the other hand, host 150 may have crashed due to an inability to keep up with processing frames, an overload of applications, or numerous other errors. Thus, the predetermined wait time allows host 150 to catch up, if host 150 has not already crashed. In one implementation, the predetermined time is set automatically based on, for example, a default setting, detected capabilities of the host 150, the size of the requested data, the speed of the connection between host 150 and media 100, or various other factors. Alternatively, a user or system administrator can set this value to fine-tune request and receipt of data from media 100.

In step 415, a determination is made whether the predetermined time has elapsed without an ACK_BALANCE signal, i.e., whether host 150 has "timed out". If the predetermined time has elapsed, then it is likely that host 150 has either crashed or is unacceptably behind in processing received frames. Therefore, the time-out situation is used to proceeds to error recovery in step 410.

More specifically, in step 410, system firmware comes in and cleans up after the error or timeout. The system firmware is able to detect how many blocks were sent successfully by referring to the location of known good pointer 116. More specifically, since known good pointer 116 points to the location of the last known block of data that has been successfully sent to the host, the system firmware can use this pointer to detect where to re-start transmission from in the case of an error in transmission or failure of host 150. The system firmware may also commence other processes to clean up after the error, such as resetting registers and clearing rate matching FIFO 130. The process then proceeds to step 411.

In step 411, transmission of data from buffer memory 110 is resumed from the location of known good pointer 116. Thus, data transmission to host 150 is able to automatically resume from the last block that was transferred successfully, rather than having to re-start transmission of an entire buffer memory's worth of data.

On the other hand, if and when all outstanding frames are successfully received at host 150, an ACK_BALANCE signal is detected from host 150 in step 416. Since the ACK_BALANCE signal indicates that the outstanding frames have been successfully transferred, the ACK_BALANCE signal is an indication that the space in buffer memory 110 for the blocks in those frames can now be cleared.

Thus, in step 417, the content of block count accumulator register 144 is moved to buffer release circuit 160. It should be noted that this is different from the process within the FC environment, in which buffer release circuit 160 receives the content of blocks-per-frame register 142.

In step 418, block release circuit 160 converts the value received from FIFO output 140 into a series of buffer release pulses for transmission to buffer memory 110, and in step 419, the buffer release pulses are transferred from block release logic 160 to buffer memory 110.

In step 420, buffer memory 110 releases space in accordance with the pulses received from buffer release circuit 160. The released space can then be used to store new data from media 100.

In step 421, the value stored in block count accumulator register 144 is reset to 0 so that block count accumulator register 144 can begin counting again for a new set of frames in a data request. In addition, resetting block count accumulator register 144 ensures that block count accumulator register 144 does not reflect already-transmitted data, which could lead to the limit in block count limit register 146 being reached prematurely.

Finally, in step 422, known good pointer 116 is updated to reflect the blocks that were successfully transferred to host 150. More specifically, known good pointer 116 is updated to reflect the number of blocks corresponding to the number of pulses received from buffer release circuit 160, which in turn indicates how many blocks were successfully transferred. Accordingly, if there is any subsequent error in transmission, transmission can resume from the location of known good pointer 116, rather than having to reload or re-transmit the entire contents of the buffer.

FIG. 5 is a graphical representation of a sample progression of signals of the invention in an SAS disk environment. The top of FIG. 5 indicates a series of blocks being read from media 100 for transmission to host 150. As can be seen, the data in a block can sometimes span two frames, and this situation is handled the same as in the FC environment described above. That is, a block spanning two frames is counted in the frame in which the block ends, rather than the frame in which the block originates.

Block/Frame 520 indicates the value stored in blocks-per-frame register 142. Thus, as can be seen in FIG. 5, Block/Frame 520 counts a value 1 for the first block 500 in frame 510, and counts a value 2 for the second block 502 in frame 510. Since block 504 does not end in frame 510, block 504 is not recorded in blocks-per-frame register 142 for frame 510, and instead is recorded as the first block in frame 512, the frame in which block 504 ends. In one implementation, the value in blocks-per-frame register is reset to 0 after each frame is transmitted.

Block count accumulator 530 depicts the value stored in block count accumulator register 144 over time. In one implementation, the block count accumulator register value is increased by a number equal to the number of blocks in the current frame, and this increment occurs after the total number of blocks in the frame is determined. In one implementation, the value of block count accumulator register 144 is reset to 0 after the ACK_BALANCE signal 542 is received.

Block Release 550 depicts the buffer release pulses that are sent from buffer release circuit 160 upon receipt of the ACK_BALANCE. The number of pulses sent after the ACK_BALANCE signal is equal to the content of the block accumulator register 144 at the time of issuing the ACK_BALANCE signal ("5" in FIG. 5). Thus, the resetting of the block count accumulator register 144 and the transfer of the block count accumulator register contents to buffer release circuit 160 occur very close to each other temporally, although of course the transfer of the block count accumulator register contents to buffer release circuit 160 must occur first before the contents of block count accumulator register 144 are reset to 0.

Thus, by virtue of the above, it is possible to re-start transmission after a transmission error or failure from the last successfully transferred block. In addition, since buffer space is cleared as data is transmitted successfully, it is possible to increase throughput of the buffer memory, which allows for a smaller, less expensive, and more power-efficient buffer.

Figure 6A:
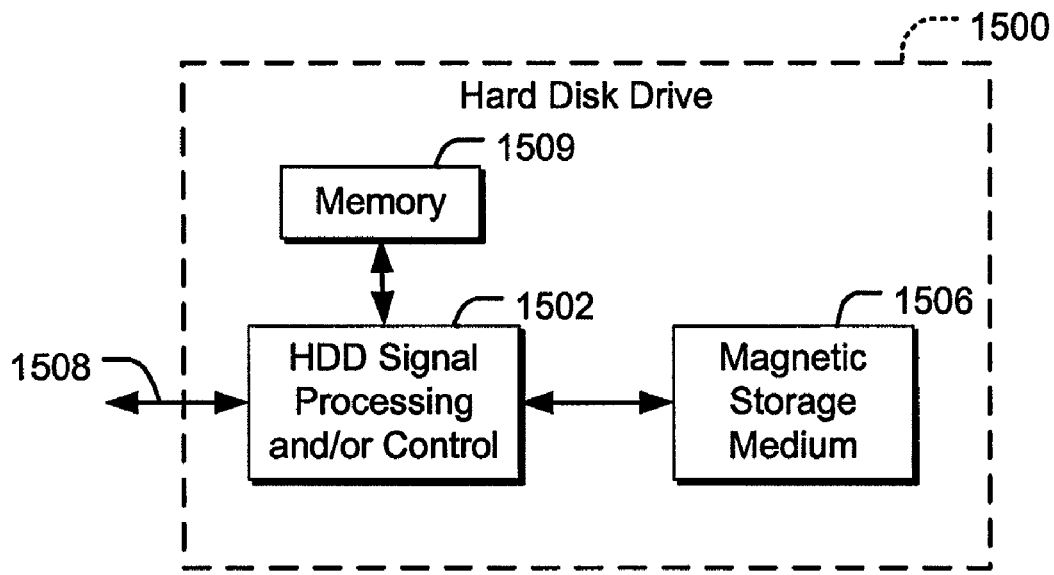
FIG. 6A is a block diagram showing an embodiment of the invention in a hard disk drive (HDD).

Referring now to FIGS. 6A-6H, various exemplary implementations of the present invention are shown. Referring to FIG. 6A, the present invention may be embodied as a controller in a hard disk drive (HDD) 1500. The present invention may implement either or both signal processing and/or control circuits, which are generally identified in FIG. 6A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 6B:
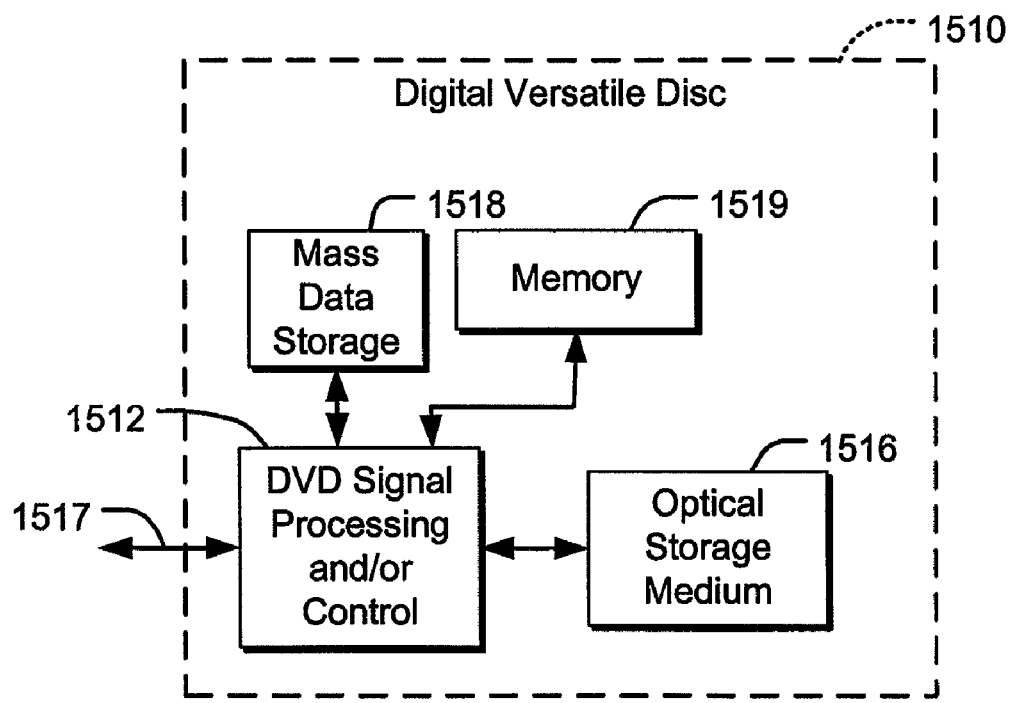
FIG. 6B is a block diagram of the invention in a digital versatile disc (DVD) drive.

Referring now to FIG. 6B, the present invention may be embodied as a controller in a digital versatile disc (DVD) drive 1510. The present invention may implement either or both signal processing and/or control circuits, which are generally identified in FIG. 6B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage 1518 that stores data in a nonvolatile manner. Mass data storage 1518 may include a hard disk drive (HDD) such as that shown in FIG. 6A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 6C:
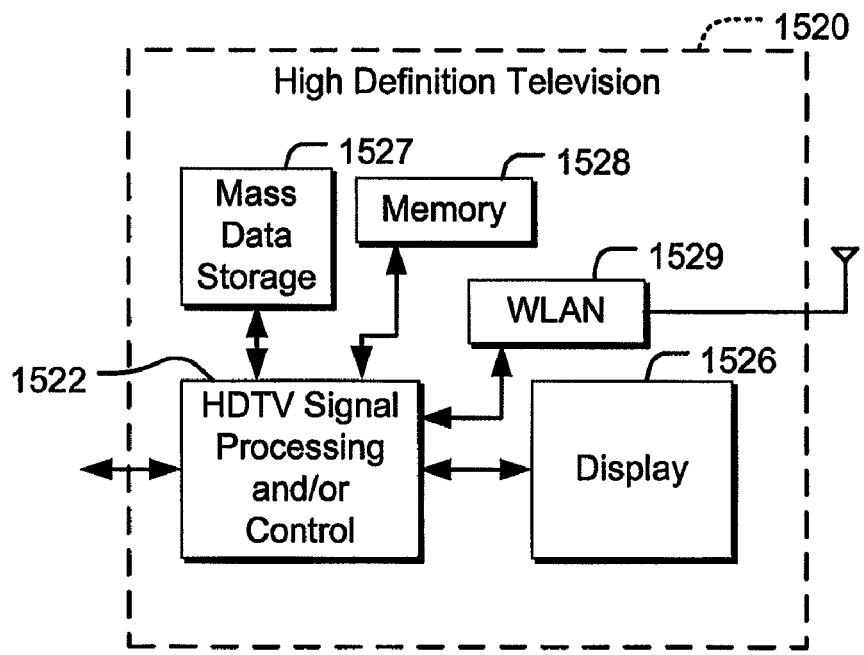
FIG. 6C is a block diagram of the invention in a high definition television (HDTV).

Referring now to FIG. 6C, the present invention may be embodied as a controller in a high definition television (HDTV) 1520. The present invention may implement either or both signal processing and/or control circuits, which are generally identified in FIG. 6C at 1522, a WLAN network interface 1529 and/or mass data storage 1527 of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices, for example, hard disk drives and/or DVD drives. At least one HDD may have the configuration shown in FIG. 6A and/or at least one DVD drive may have the configuration shown in FIG. 6B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via WLAN network interface 1529.

Figure 6D:
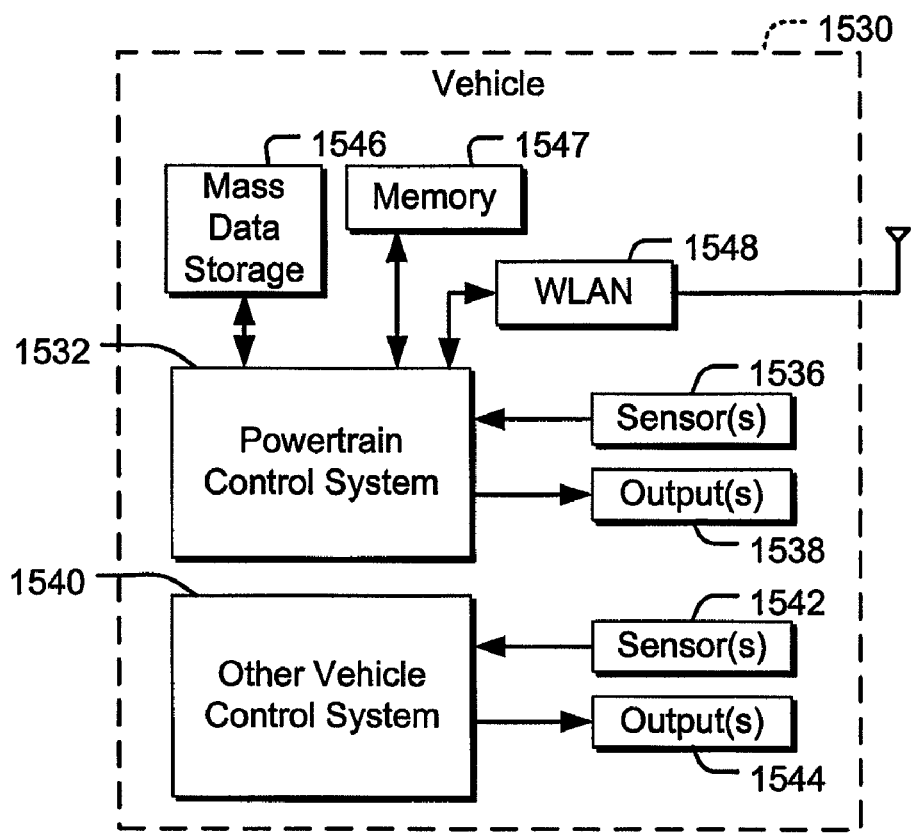
FIG. 6D is a block diagram of the invention in a vehicle.

Referring now to FIG. 6D, the present invention may be embodied as a controller in a control system of a vehicle 1530, a WLAN network interface 1548 and/or mass data storage 1546 of the vehicle 1530. In some implementations, the present invention implements a powertrain control system 1532 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices, for example, hard disk drives and/or DVD drives. At least one HDD may have the configuration shown in FIG. 6A and/or at least one DVD drive may have the configuration shown in FIG. 6B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via WLAN network interface 1548. The control system 1540 may also include mass data storage, memory and/or a WLAN network interface (all not shown).

Figure 6E:
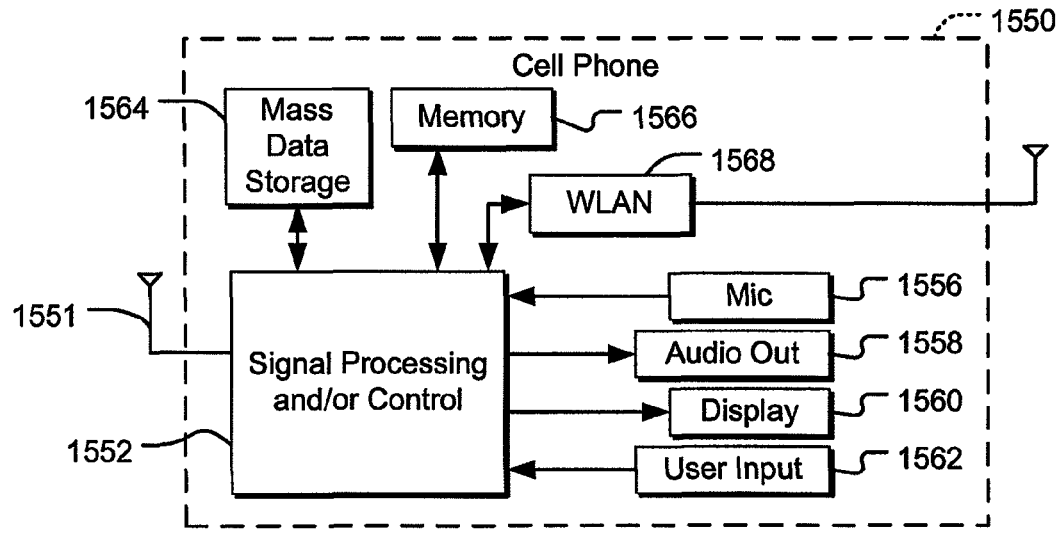
FIG. 6E is a block diagram of the invention in a cellular or mobile phone.

Referring now to FIG. 6E, the present invention may be embodied as a controller in a cellular phone 1550 that may include a cellular antenna 1551. The present invention may implement either or both signal processing and/or control circuits, which are generally identified in FIG. 6E at 1552, a WLAN network interface 1568 and/or mass data storage 1564 of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices, for example, hard disk drives and/or DVD drives. At least one HDD may have the configuration shown in FIG. 6A and/or at least one DVD drive may have the configuration shown in FIG. 6B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via WLAN network interface 1568.

Figure 6F:
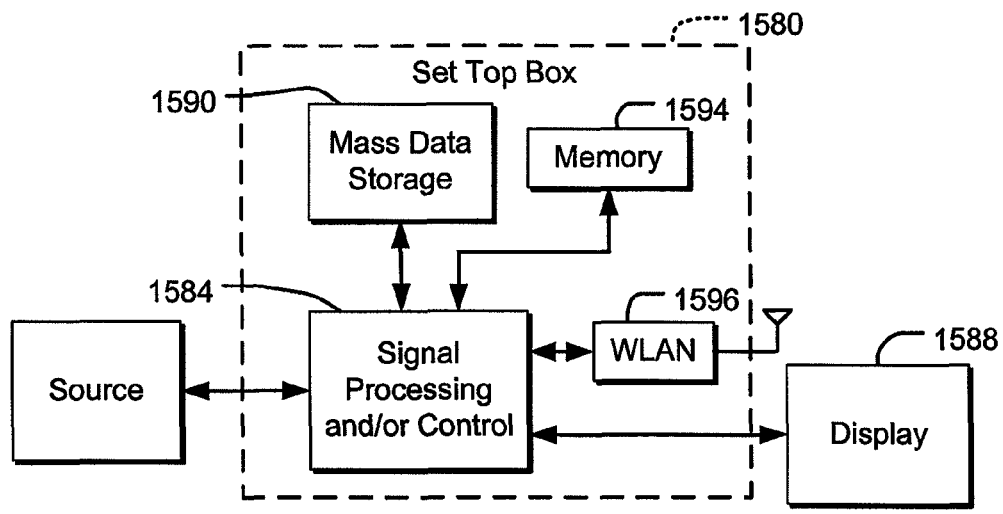
FIG. 6F is a block diagram of the invention in a set-top box (STB).

Referring now to FIG. 6F, the present invention may be embodied as a controller in a set top box 1580. The present invention may implement either or both signal processing and/or control circuits, which are generally identified in FIG. 6F at 1584, a WLAN network interface 1596 and/or mass data storage 1590 of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices, for example, hard disk drives and/or DVD drives. At least one HDD may have the configuration shown in FIG. 6A and/or at least one DVD drive may have the configuration shown in FIG. 6B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via WLAN network interface 1596.

Figure 6G:
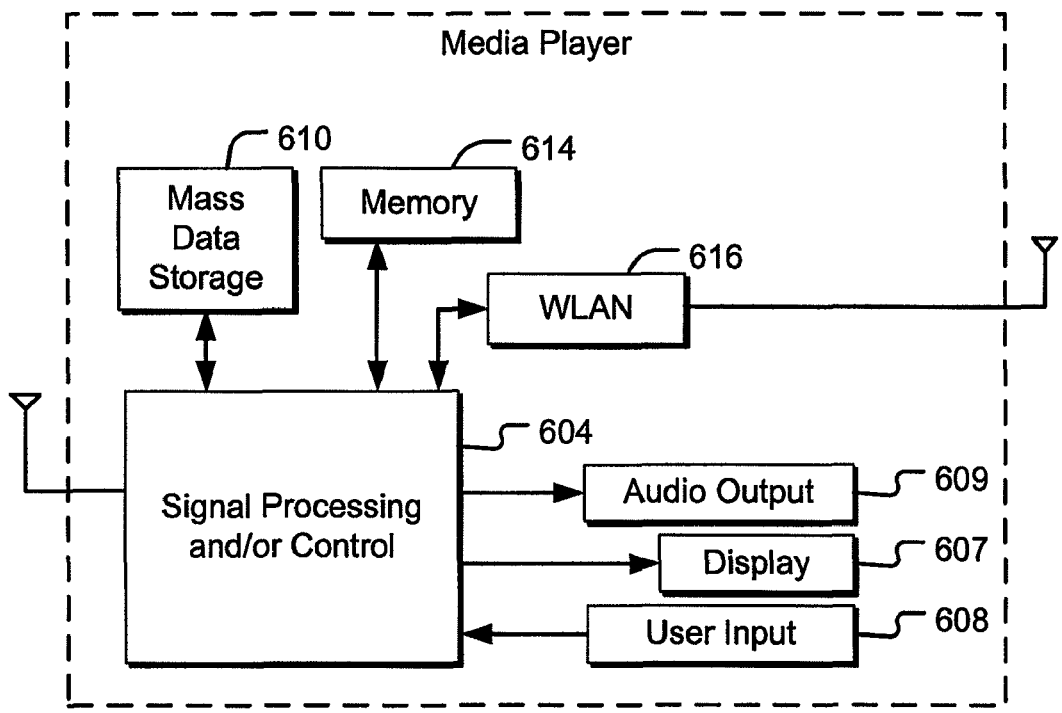
FIG. 6G is a block diagram of the invention in a media player.

Referring now to FIG. 6G, the present invention may be embodied as a controller in a media player 600. The present invention may implement either or both signal processing and/or control circuits, which are generally identified in FIG. 6G at 604, a WLAN network interface 616 and/or mass data storage 610 of the media player 600. In some implementations, media player 600 includes a display 607 and/or a user input 608 such as a keypad, touchpad and the like. In some implementations, media player 600 may employ a graphical user interface (GUI) that typically employs menus, drop down menus, icons and/or a point-and-click interface via display 607 and/or user input 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage 610 may include optical and/or magnetic storage devices, for example, hard disk drives and/or DVD drives. At least one HDD may have the configuration shown in FIG. 6A and/or at least one DVD drive may have the configuration shown in FIG. 6B. The HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via WLAN network interface 616. Still other implementations in addition to those described above are contemplated.

Figure 6H:
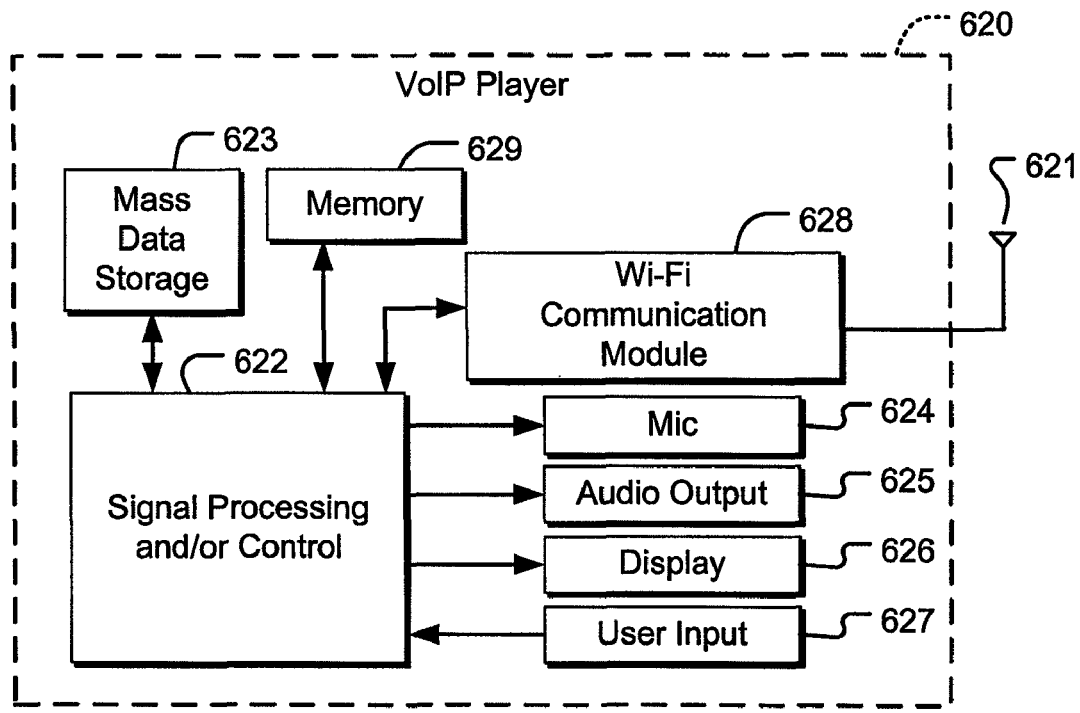
FIG. 6H is a block diagram of the invention in a Voice-over Internet Protocol (VoIP) phone.

Referring to FIG. 6H, the present invention may be embodied as a controller in a Voice over Internet Protocol (VoIP) phone 620 that may include an antenna 621. The present invention may implement either or both signal processing and/or control circuits, which are generally identified in FIG. 6H at 622, a wireless interface and/or mass data storage 623 of the VoIP phone 620. In some implementations, VoIP phone 620 includes, in part, a microphone 624, an audio output 625 such as a speaker and/or audio output jack, a display monitor 626, an input device 627 such as a keypad, pointing device, voice actuation and/or other input devices, and a Wireless Fidelity (Wi-Fi) communication module 628. Signal processing and/or control circuits 622 and/or other circuits (not shown) in VoIP phone 620 may process data, perform coding and/or encryption, perform calculations, format data and/or perform other VoIP phone functions.

VoIP phone 620 may communicate with mass data storage 623 that stores data in a nonvolatile manner such as optical and/or magnetic storage devices, for example, hard disk drives and/or DVD drives. At least one HDD may have the configuration shown in FIG. 6A and/or at least one DVD drive may have the configuration shown in FIG. 6B. The HDD may be a mini HDD that includes one or more platters having a diameter that is smaller than approximately 1.8". VoIP phone 620 may be connected to memory 629, which may be a RAM, ROM, low latency nonvolatile memory such as flash memory and/or other suitable electronic data storage. VoIP phone 620 is configured to establish communications link with a VoIP network (not shown) via Wi-Fi communication module 628.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for accounting for data transmitted from a storage medium to a host in response to a data request from the host, the method comprising:
    transferring one or more blocks of data from the storage medium to a buffer memory;
    transmitting a frame of data from the buffer memory to the host, wherein a total number of blocks that end in the frame is recorded in a blocks/frame register;
    sending one or more buffer release pulses to the buffer memory upon transmission of the frame to the host, wherein a total number of the one or more buffer release pulses is based on the total number of blocks recorded in the blocks/frame register for the frame;
    releasing buffer space for one block in the buffer memory for each buffer release pulse received; and
    updating a known good pointer in the buffer memory based on the one or more buffer release pulses, wherein the known good pointer points to a position in the buffer memory corresponding to a last known block that has been successfully transferred to the host.

2. The method according to claim 1, wherein if an error occurs in transmission of data to the host, transmission of data to the host is re-started from the buffer memory at the position pointed to by the known good pointer.

3. The method according to claim 1, wherein the blocks/frame register is reset to 0 after each frame is transmitted from the buffer memory.

4. The method according to claim 1, wherein the buffer memory comprises a circular buffer.

5. A method for accounting for data transmitted from a storage medium to a host in response to a data request from the host, the method comprising:
    transferring one or more blocks of data from the storage medium to a buffer memory;
    transmitting one or more frames of data from the buffer memory to the host, wherein a total number of blocks ending in each transmitted frame is recorded in a blocks/frame register and added into a block count accumulator register;
    detecting a signal from the host, from which it can be determined that all outstanding frames that have been sent from the buffer memory have been received by the host;
    sending one or more buffer release pulses to the buffer memory upon detecting the signal, wherein a total number of the one or more buffer release pulses is based on the total number of blocks recorded in the block count accumulator register;
    releasing buffer space for one block in the buffer memory for each buffer release pulse received; and
    updating a known good pointer in the buffer memory based on the one or more buffer release pulses, wherein the known good pointer points to a position in the buffer memory that corresponds to a last known block that has been successfully transferred to the host.

6. The method according to claim 5, wherein if an error occurs in transmission of data to the host, transmission of data to the host is re-started from the buffer memory at the position pointed to by the known good pointer.

7. The method according to claim 5, wherein a block count limit register holds a limit number of blocks, and transmission of frames is halted if the total number of blocks in the block count accumulator register exceeds the limit number of blocks in the block count limit register.

8. The method according to claim 7, wherein transmission of frames is halted until the signal is detected.

9. The method according to claim 8, wherein if the signal is not received before a predetermined period of time elapses, a timeout condition occurs and transmission is re-started based on the known good pointer.

10. The method according to claim 9, wherein the signal comprises an ACK_BALANCE signal which indicates that the host has successfully received all frames which have been transmitted since the last occurrence of the signal.

11. The method according to claim 5, wherein the block count accumulator register value is reset to 0 once the signal is detected from the host.

12. The method according to claim 5, wherein the blocks/frame register is reset to 0 after each frame is transmitted.

13. The method according to claim 5, wherein the buffer memory comprises a circular buffer.

14. The method according to claim 5, wherein error detection data is added to the block.

15. A system for accounting for data transmitted from a storage medium to a host in response to a request from the host, the system comprising an FC disk interface subsystem and an SAS disk interface subsystem,
    wherein the FC disk interface subsystem comprises:
    a first transfer unit to transfer one or more blocks of data from the storage medium to a first buffer memory;
    a first transmission unit to transmit a frame of data from the first buffer memory to the host, wherein a total number of blocks ending in the frame is recorded in a first blocks/frame register;
    a first buffer pulse unit to send one or more first buffer release pulses to the first buffer memory upon transmission of the frame, wherein a total number of the one or more first buffer release pulses is based on the total number of blocks recorded in the first blocks/frame register for the frame; and
    a first buffer release unit to release the buffer space for one block in the first buffer memory for each first buffer release pulse received; and
    wherein the SAS disk interface subsystem comprises:
    a second transfer unit to transfer one or more blocks of data from the storage medium to a second buffer memory;
    a second transmission unit for transmitting one or more frames of data from the second buffer memory to the host, wherein a total number of blocks ending in each transmitted frame is recorded in a second blocks/frame register and added into a block count accumulator register;
    a detection unit for detecting a signal from the host, from which it can be determined that all outstanding frames that have been sent from the second buffer memory have been received by the host;
    a second buffer pulse unit for sending one or more second buffer release pulses to the second buffer memory upon detecting the signal, wherein a total number of the one or more second buffer release pulses is based on the total number of blocks recorded in the block count accumulator register;
    a second buffer release unit to release buffer space for one block in the second buffer memory for each second buffer release pulse received; and
    an updating unit to update a known good pointer in the second buffer memory based on the one or more second buffer release pulses, wherein the known good pointer points to a position in the second buffer memory that corresponds to a last known block that has been successfully transferred to the host.

* * * * *